April 4, 1967  C. R. JARRETT ETAL  3,312,055
PNEUMATIC ACTUATORS

Filed May 12, 1965  3 Sheets-Sheet 1

Inventors
C. R. Jarrett
J. E. Medgett

By
Watson, Cole, Grindle & Watson
Attys.

United States Patent Office 3,312,055
Patented Apr. 4, 1967

3,312,055
PNEUMATIC ACTUATORS
Charles Roy Jarrett, Griffithstown, and John Edward Medgett, Hereford, England, assignors to Saunders Valve Company Limited, Cwmbran, England, a British company
Filed May 12, 1965, Ser. No. 455,065
Claims priority, application Great Britain, May 14, 1964, 20,141/64
10 Claims. (Cl. 60—37)

This invention relates to pneumatic actuators, that is to say, devices which exert a thrust action under gas pressure. They are especially useful for opening and closing valves under remote control, but have numerous other fields of use.

According to the present invention the gas space of the actuator is in closed communication with an electrolytic cell in which electrodes and an electrolyte enable gases to be generated whereby the actuator is operated and means are also provided in the closed space whereby the gases can be caused to recombine enabling the actuator to retract under reaction of an external force, suitably a force exerted by spring means. Such an actuator can be used where there is no supply of compressed air but electricity is available.

The electrolyte is suitably one which is decomposed into two gases, the recombination of which can be initiated by heat, in which case an electric heater is a convenient source of the necessary heat. Thus, the electrolyte may be an aqueous solution of an alkali or an acid so that the gases produced consist of oxygen and hydrogen. An alkali, such as a solution of sodium hydroxide in water (15 percent by weight) is very suitable and has the advantage over an acid solution in that the parts with which it comes into contact can be made of cast iron, without serious chemical attack occurring.

Since the actuator may be in a position where it cannot be kept under observation, some means is usually provided to ensure that the supply to the cell is automatically cut off when the actuator reaches its extreme operated position. Thus the supply to the electrolytic cell may be controlled by two switches in series, one of which is a manual switch which when closed by the operator remains closed while the other is an auxiliary switch which is urged by a spring or the like to closed position but is opened automatically when the actuator reaches its extreme operated position, suitably being directly mechanically opened by a moving part of or attached to the actuator. The auxiliary switch will reclose and maintain the pressure should there be any gas leakage, a substantial excess of electrolyte being provided to permit this.

The heater used to initiate recombination of the gases, may conveniently be supplied from the same source of electric current as the electrodes but since in general the power consumption of the heater will be susbtantially higher than that required to effect electrolysis, change-over switching means may be provided which, when switched to heater operation, automatically return to the off position when the operator releases the switching means. When a manual switch is provided in series with an auxiliary switch as described above, this same manual switch may also constitute the change-over switching means above described. The change-over could be a direct one if a supply at a suitable voltage is available, but where the supply is to be drawn from conventional alternating current mains the manual change-over switch in the position for operation of the actuator connects the supply terminals to the primary winding of a transformer through the auxiliary switch, and in the position for operation of the heater connects the supply terminals directly to the primary winding, while a second change-over switch in the former position of the manual switch connects the low-voltage secondary winding of the transformer through a rectifier (since the cell must be supplied with direct current) to the electrolytic cell, and in the latter position of the manual switch it connects the second winding to the heater. The second change-over switch could be mechanically coupled to the manual switch but it is more convenient to construct it as a relay, the winding of which is unexcited in the position of the manual switch for supplying the cell and is excited in the position of the manual switch for supplying the heater, its contacts being arranged accordingly.

The invention will be further described with reference to the accompanying drawings.

Figure 1:
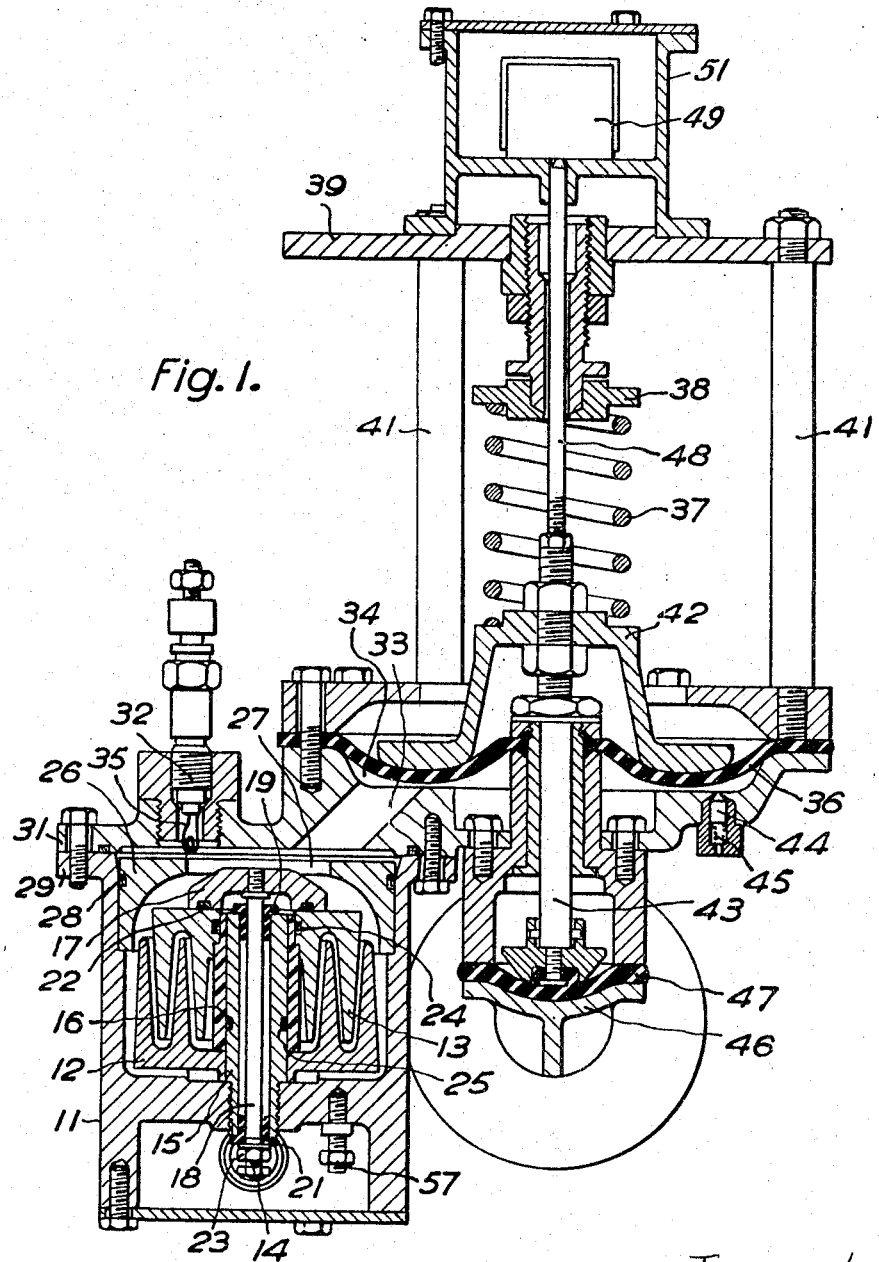
FIG. 1 is a vertical section of an example of the invention combined with a valve and arranged to open the valve when it is operated against spring pressure which retracts the actuator and closes the valve when the gases are recombined.

In the example illustrated in FIG. 1, the cell comprises a metallic pot 11, suitably a casting having two concentric electrodes 12, 13 within it of intermeshing cross section, the electrode 12 being in metallic contact with the pot and the electrode 13 being electrically insulated and electrically connected in a fluid tight manner to an external terminal 14. The electrode 12 is centred by a central hollow pillar 15 upstanding from the bottom of the pot; in this example the pillar is screwed in. The electrode 13 is centred and also supported by an insulating sleeve 16 on the pillar 15, the lower end of the sleeve resting on the bottom of the electrode 12 and the sleeve being shouldered near its upper end to support the electrode 13. The connection of the electrode 13 to the terminal 14 is made by a metallic head 17 which engages the upper end of the electrode 13 and a metallic rod 18 which extends downwardly through the pillar 15 from which the rod is insulated by insulating bushes 19, 21. A fluid tight joint must be provided to prevent escape of electrolyte or gas along the path of the rod. To this end, an O-ring 22 is lodged in a groove in the under face of the head 17 to make a fluid tight joint with the top of the electrode 13, and the head is held firmly against the electrode by means of a nut 23 screwing on the lower end of the rod 18. In addition O-rings are provided at 24 between the electrode 13 and the sleeve 16, and at 25 between the sleeve 16 and pillar 15, to prevent leakage which might occur upwardly between the sleeve 16 and pillar 15 within the diameter of the O-ring 22. In the upper into the space between the head 17 and the top of the pillar 15 within th diameter of the O-ring 22. In the upper part of the pot 11 is a cover 26 with a central aperture 27 of substantially smaller diameter than the pot to enable the whole to be tilted without reducing the effective immersion of the electrodes. An O-ring 28 avoids leakage between the cover and pot. The top of the pot has a flange 29 by which it can be bolted to the bottom plate 31 of an actuator and a heater in the form of a glow plug 32 is in the example mounted in the plate 31 closely above the central aperture 27 whence a passage 33 leads to the gas space 34 in the actuator. The glow plug 32 could be mounted at any other convenient point which would bring its element 35 into contact with the gases above the electrolyte.

The operating member of the actuator os a diaphragm 36. The reaction to the gas pressure is here provided by a spring 37 which abuts a keep 38 adjustably carried by a platform 39 tied by rods 41 to the actuator structure, and acts through a plate 42 resting on the diaphragm and carrying a spindle 43 by which the force exerted by the gas or spring is conveyed to the apparatus to be operated by the actuator. Desirably a safety valve 44 loaded by a spring 45 is provided to prevent the pressure in the gas space from rising to a dangerous value. In this particular example the actuator is used for opening and closing a valve having a weir 46 with which cooperates a diaphragm 47 constituting the obturating member of the valve and the actuator is arranged so that the gas pressure opens the valve and the spring 37 closes it. The general arrangement of the actuator is on the lines shown in the British Patent No. 684,319. A rod 48 for operating an auxiliary switch 49 (FIGURES 1 and 2) extends from the plate 42 in the opposite direction to the valve spindle 43, the switch being within a casing 51 supported on the platform 39. The rod 48 and switch 49 are arranged so that the switch is urged by springs or the like to closed position but is opened when the actuator is at the exertme operated position corresponding to the fully open position of the valve.

Figure 2:
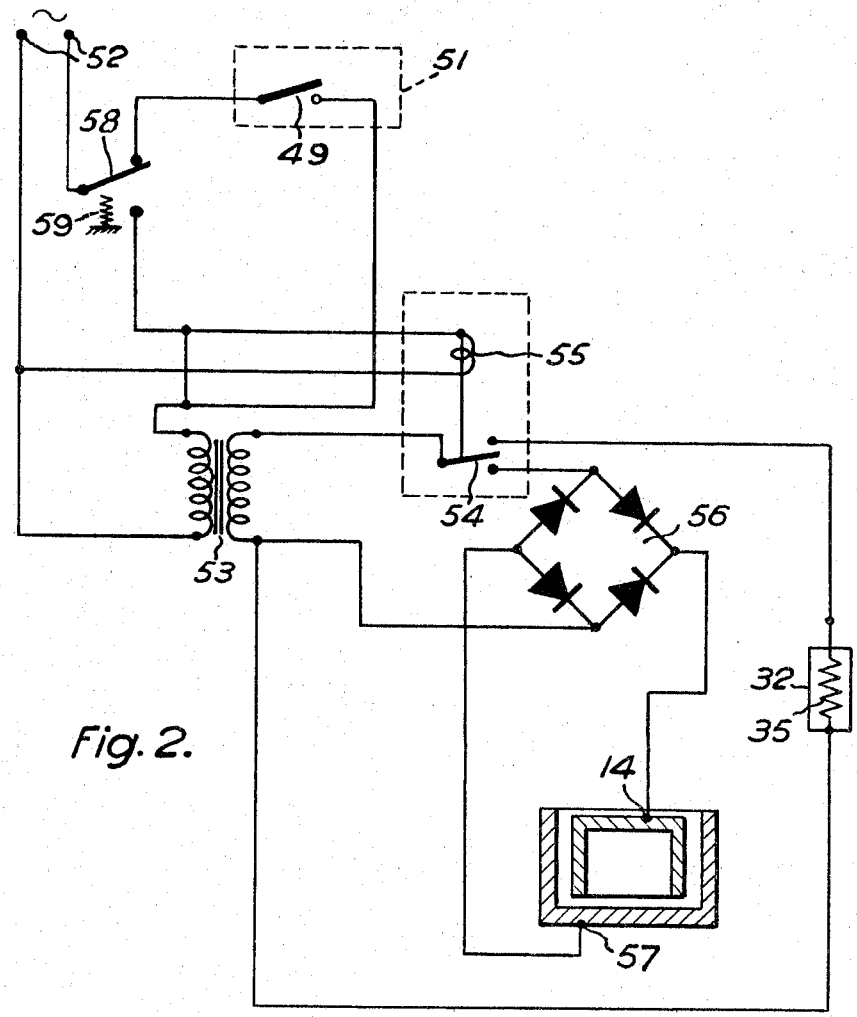
FIG. 2 is a circuit diagram showing how the actuator may be supplied from conventional alternating current mains.

The electrolytic cell needs to be supplied with direct current at a voltage much lower than a conventional main supply. FIGURE 2 shows how the supply can be obtained from conventional alternating current mains connected to terminals 52 as well as how the operation of the actuator can be controlled. A transformer 53 is provided with a low voltage secondary winding one end of which leads to the contact arm 54 controlled by a changeover relay winding 55. When the relay is in the release position shown, the relay contacts connect the secondary winding of the transformer 53 through a rectifier bridge 56 to the terminals 14 and 57 (see also FIGURE 1) of the electroytic cell. When the relay is excited its contacts connect the secondary winding to the glow plug 32, 35.

The manual control switch 58 is a two-way changeover switch which, when moved to one position, (the upper position in FIGURE 2) remains engaged and connects the primary winding of the transformer 53 to the mains terminals 52 through the auxiliary switch 49 which as above described is opened when the actuator reaches its extreme operated position. In this position of the auxiliary switch 49 the primary winding of the transformer 53 is disconnected. If there is any leakage of gas sufficient to cause the actuator to move just far enough to allow the switch 49 to close, the transformer will be reconnected and more gas will be produced, the volume of electrolyte in the cell being made adequate to provide for such contingencies.

When the control switch 58 is thrown over to its other position a spring 59 urges it to its mid "off" position so that it must be held in this thrown over position. In this position it connects the primary winding of the transformer 53 directly to the mains terminals 52 and also connects the relay winding 55 to the mains terminals 52 so that the glow plug 32, 35 is now supplied as long as the control switch 58 is positively held closed, but as soon as this switch is released, the spring 59 returns it to the "off" position thus relieving the transformer of load. This enables the transformer to be designed for the load presented by the electrolytic cell but to cope with the heavier load presented by the glow plug for the short time which is necessary to cause recombination of the gases to be initiated. When this takes place the spring 37 retracts the actuator to the position of FIGURE 1 in which the valve is closed.

Figure 3:
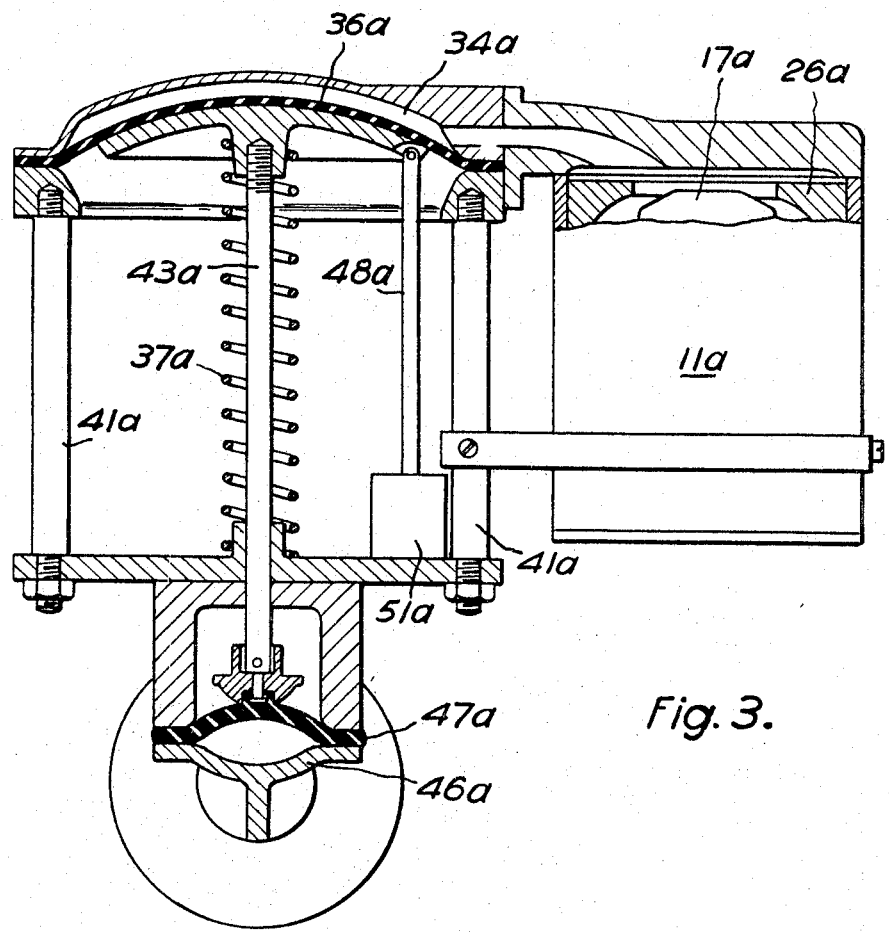
FIG. 3 is a diagramatic section of another example of the invention combined with a valve and arranged to close the valve when it is operated against spring pressure which retreacts the actuator and opens the valve when the gases are recombined.

The actuator can be arranged to work the opposite way to that shown in FIGURE 1, that is to close the valve under gas pressure and open it under spring action. To this end the spring 37a would be arranged between the diagphragm 36a and the valve or be replaced by a tension spring while the passage 33 would lead to an enclosed space above the diaphragm. Such an arrangement is shown in principle in FIGURE 3 in which these parts which correspond with those of FIGURE 1 have been given the same references with the suffix a. It is believed that the mode of operation will be clear without further description. A further possibility would be to substitute a piston for a diaphragm in the actuator, but a diaphragm has the advantage that over a long period it is easier to keep the gas space tight.

It should be mentioned that in place of the glow plug 32 a heater in the form of a sparking plug may be used in which case a suitable supply must be provided for example an induction coil taking the place of the glow plug 32, 35 in FIGURE 2. With a pulsating supply such as that furnished by the circuit shown in FIGURE 2 it might not be necessary to provide the coil with a trembler. Again in particular cases the supply could be drawn from a low tension battery such as a motor car battery in which case the transformer 53 and the rectifier 56 would be unnecessary. If a coil and sparking plug were used in this case a trembler would be essential.

Finally, it should again be mentioned that the actuator can be used for other purposes than opening and closing a valve.

What we claim is:

1. A pneumatic actuator having a gas space of the actuator in closed communication with an electrolytic cell in which electrodes and an electrolyte enable gases to be generated whereby the actuator is operated, means in the closed space whereby the gases can be caused to recombine enabling the actuator to retract under reaction of an external force, the electrolytic cell comprising a metallic container, two electrodes of intermeshing cross section within the container, one of the electrodes being in metallic contact with the container and the other being insulated from the container and connected fluid tight to an external terminal, and a cover in the upper part of the container with a central aperture of substantially smaller diameter than the container.

2. A pneumatic actuator according to claim 1 in which the two electrodes are concentric with one electrode being centred by a central hollow pillar upstanding from the bottom of the container and the other being centred and supported by an insulating sleeve on the pillar, the connection of the last-mentioned electrode to the external terminal being made by a head engaging the upper end of this electrode and a metallic rod extending downwardly from the head through the pillar from which the rod is insulated insulating bushes, fluid-tight joints being provided to prevent the escape of fluid along the path of the rod to the external terminal.

3. A pneumatic actuator according to claim 1 in which the gas space is provided with a safety valve.

4. A pneumatic actuator according to claim 1 in which the electrolyte is one which is decomposed into gases, the recombination of which can be initiated by heat, an electric heater being provided by which the necessary heat can be supplied.

5. A pneumatic actuator according to claim 1 in which the electrolyte is an aqueous solution which is decomposed into oxygen and hydrogen.

6. A pneumatic actuator according to claim 1 in which the electrolyte is a solution of sodium hydroxide.

7. A pneumatic actuator according ot claim 1 in which the supply to the electrodes is controlled by two switches in series one of which is a manual switch which when closed by an operator remains closed, while the other is an axuliary switch which is urged towards closed position by a spring but is opened automatically when the actuator reaches its extreme operated position.

8. A pneumatic actuator according to claim 1, including a manual switch having a mid-"off" position, a first actuated position in one direction from the "off" position in which it remains when moved to that position by an operation, a second actuated position in the other direction from the "off" position, a return spring urging the manual switch from the second actuated position to the "off" position, an axuiliary switch, an operating spring urging the auxiliary switch to its closed position, means operated by the actuator in its extreme operated position which opens the auxiliary switch against its operating spring, said manual switch in its first actuated position and said auxiliary switch in its closed position completing a supply circuit to the electrodes, and said manual switch when move to its second actuated position completing a supply circuit to the heater.

9. A pneumatic actuator according to claim 1, including a manual switch having a mid-"off" position, a first actuated position in one direction from the "off" position in which it remains when moved to that position by an operation, a second actuated position in the other direciton from the "off" position, a return spring urging the manual switch from the second actuated position to the "off" position, an auxiliary switch, an operating spring urging the auxiliary switch to its closed position, means operated by the actuator in its extreme operated position which opens the auxiliary switch against its operating spring, said manual switch in its first actuated position and said auxiliary switch in its closed position completing a supply circuit to the electrodes, and said manual switch when moved to its second actuated position completing a supply circuit to the heater, a transformer the primary winding of which is connected to supply terminals in either actuated position of the manual switch as long as the auxiliary switch is closed, the actuator further including a rectifier and a change-over switch controlled by the manual switch, and the change-over switch in the first actuated position of the manual switch connecting the electrodes to the transformer secondary through the rectifier and in the second actuated position of the manual switch connecting the heater directly to the transformer secondary.

10. A pneumatic actuator according to claim 1, including a manual switch having a mid-"off" position, a first actuated position in one direction from the "off" position in which it remains when moved to that position by an operation, a second actuated position in the other direction from the "off" position, a return spring urging the manual switch from the second actuated position to the "off" position, an auxiliary switch, an operating spring urging the auxiliary switch to its closed position, means operated by the actuator in its extreme operated position which opens the auxiliary switch against its operating spring, said manual switch in its first actuated position and said auxiliary switch in its closed position completing a supply circuit to the electrodes, and said manual switch when moved to its second actuated position completing a supply circuit to the heater, a transformer the primary winding of which is connected to supply terminals in either actuated position of the manual switch as long as the auxiliary switch is closed, the actuator further including a rectifier and a change-over switch controlled by the manual switch, and the change-over switch in the first actuated position of the manual switch connecting the electrodes to the transformer secondary through the rectifier and in the second actuated position of the manual switch connecting the heater directly to the transformer secondary, said changeover switch is in the form of a relay having a winding, and said manual switch in its second actuated position connecting said winding directly to the supply terminals.

References Cited by the Examiner

UNITED STATES PATENTS

| 1,419,267 | 6/1922 | Kasley | 60—37 |
| 1,916,235 | 7/1933 | Ruben | 60—37 |
| 2,787,118 | 4/1957 | Markham | 60—23 |

FOREIGN PATENTS

| 319,604 | 9/1929 | Great Britain. | |

EDGAR W. GEOGHEGAN, *Primary Examiner.*